United States Patent
Bradlee et al.

(10) Patent No.: US 7,548,925 B2
(45) Date of Patent: Jun. 16, 2009

(54) DIAGRAMMATIC ACCESS AND ARRANGEMENT OF DATA

(75) Inventors: David G. Bradlee, Seattle, WA (US);
Dillon Nugent, Seattle, WA (US);
William Morein, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 293 days.

(21) Appl. No.: 11/042,317

(22) Filed: Jan. 24, 2005

(65) Prior Publication Data
US 2006/0167924 A1 Jul. 27, 2006

(51) Int. Cl.
*G06F 7/00* (2006.01)
(52) U.S. Cl. .................. 707/100; 707/102; 715/854
(58) Field of Classification Search ............. 707/102, 707/100; 715/854
See application file for complete search history.

(56) References Cited

U.S. PATENT DOCUMENTS

| | | | |
|---|---|---|---|
| 5,767,854 A | | 6/1998 | Anwar |
| 5,812,781 A | * | 9/1998 | Fahlman et al. ............. 709/226 |
| 6,167,396 A | * | 12/2000 | Lokken .......................... 707/3 |
| 6,292,810 B1 | * | 9/2001 | Richards ..................... 707/100 |
| 6,298,342 B1 | * | 10/2001 | Graefe et al. ................. 707/4 |
| 6,671,680 B1 | | 12/2003 | Iwamoto |
| 6,691,140 B1 | * | 2/2004 | Bogrett ......................... 707/1 |
| 6,774,899 B1 | * | 8/2004 | Ryall et al. ................. 345/440 |
| 6,901,555 B2 | * | 5/2005 | Hida et al. .................. 715/734 |
| 6,915,289 B1 | * | 7/2005 | Malloy et al. ............... 707/102 |
| 6,931,418 B1 | * | 8/2005 | Barnes .................... 707/103 R |
| 7,130,779 B2 | * | 10/2006 | Beverina et al. ............... 703/6 |
| 7,197,502 B2 | * | 3/2007 | Feinsmith ................... 707/100 |
| 2004/0169688 A1 | * | 9/2004 | Burdick et al. .............. 345/854 |
| 2004/0215626 A1 | * | 10/2004 | Colossi et al. .............. 707/100 |
| 2005/0039033 A1 | * | 2/2005 | Meyers et al. ............... 713/193 |
| 2006/0041539 A1 | * | 2/2006 | Matchett et al. ................ 707/3 |

FOREIGN PATENT DOCUMENTS

WO WO-00/68842 A9 11/2000

OTHER PUBLICATIONS

"ProClarity. The Power of Enterprise Analytics", ProClarity. Available at <http://www.proclarity.com/rs/> [Last Accessed: Aug. 9, 2004].
Bradlee. *Drilldown*. Last Updated May 23, 2008. pp. 1-27.

* cited by examiner

*Primary Examiner*—Vincent F Boccio
(74) *Attorney, Agent, or Firm*—Perkins Coie LLP (57) ABSTRACT

Customizable data diagrams are provided by a data diagram software facility. The facility receives a reference to a multi-dimensional data set on which to base an initial data diagram. Based, at least in part, on this information, the facility generates a data diagram providing a graphical representation of nodes corresponding to data from the multidimensional data set. The facility displays the data diagram, which can be modified by a user. For example, the facility may provide tools that allow the user to change the order of the nodes of the data diagram, change the shape of the nodes of the data diagram, change the color or format of the nodes of the data diagram, etc. The facility may also provide functionality that allows the user to drill down on aspects of the data diagram based on a breakdown scheme.

17 Claims, 8 Drawing Sheets

Raw Data

| | A | B | C | D | E | F | G |
|---|---|---|---|---|---|---|---|
| 1 | Month | Year | Type | Salesperson | Sales | Units | Region |
| 2 | Jan | 2003 | Dairy | Davis | 2686 | 5611 | West |
| 3 | Jan | 2003 | Beverages | Smith | 8725 | 6890 | North |
| 4 | Jan | 2003 | Produce | Butterworth | 6715 | 2652 | South |
| 5 | Jan | 2003 | Dairy | Jones | 4356 | 5636 | East |
| 6 | Jan | 2003 | Meat | Jones | 9662 | 3400 | North |
| 7 | Jan | 2003 | Produce | Smith | 1328 | 2861 | West |
| 8 | Feb | 2003 | Beverages | Butterworth | 3571 | 5178 | South |
| 9 | Feb | 2003 | Dairy | Davis | 6758 | 7817 | South |
| 10 | Feb | 2003 | Beverages | Butterworth | 4953 | 5889 | West |
| 11 | Feb | 2003 | Meat | Smith | 4923 | 124 | South |
| 12 | Feb | 2003 | Meat | Jones | 2666 | 744 | West |
| 13 | Feb | 2003 | Produce | Butterworth | 1450 | 234 | West |

102

Pivot Table

| | A | B | C | D | E | F |
|---|---|---|---|---|---|---|
| 1 | Sum of Sales | Type | | | | |
| 2 | Region | Beverages | Dairy | Meat | Produce | Grand Total |
| 3 | East | | 4,356 | | | 4,356 |
| 4 | North | 8,725 | | 9,662 | | 18,387 |
| 5 | South | 10,286 | 6,758 | 4,923 | 6,715 | 28,682 |
| 6 | West | 4,953 | 2,686 | 2,666 | 2,778 | 13,083 |
| 7 | Grand Total | 23,964 | 13,800 | 17,251 | 9,493 | 64,508 |

DIAGRAMMATIC ACCESS AND ARRANGEMENT OF DATA

TECHNICAL FIELD

The described technology relates generally to accessing and manipulating data via diagrams and other graphical representations.

BACKGROUND

Figure 1:
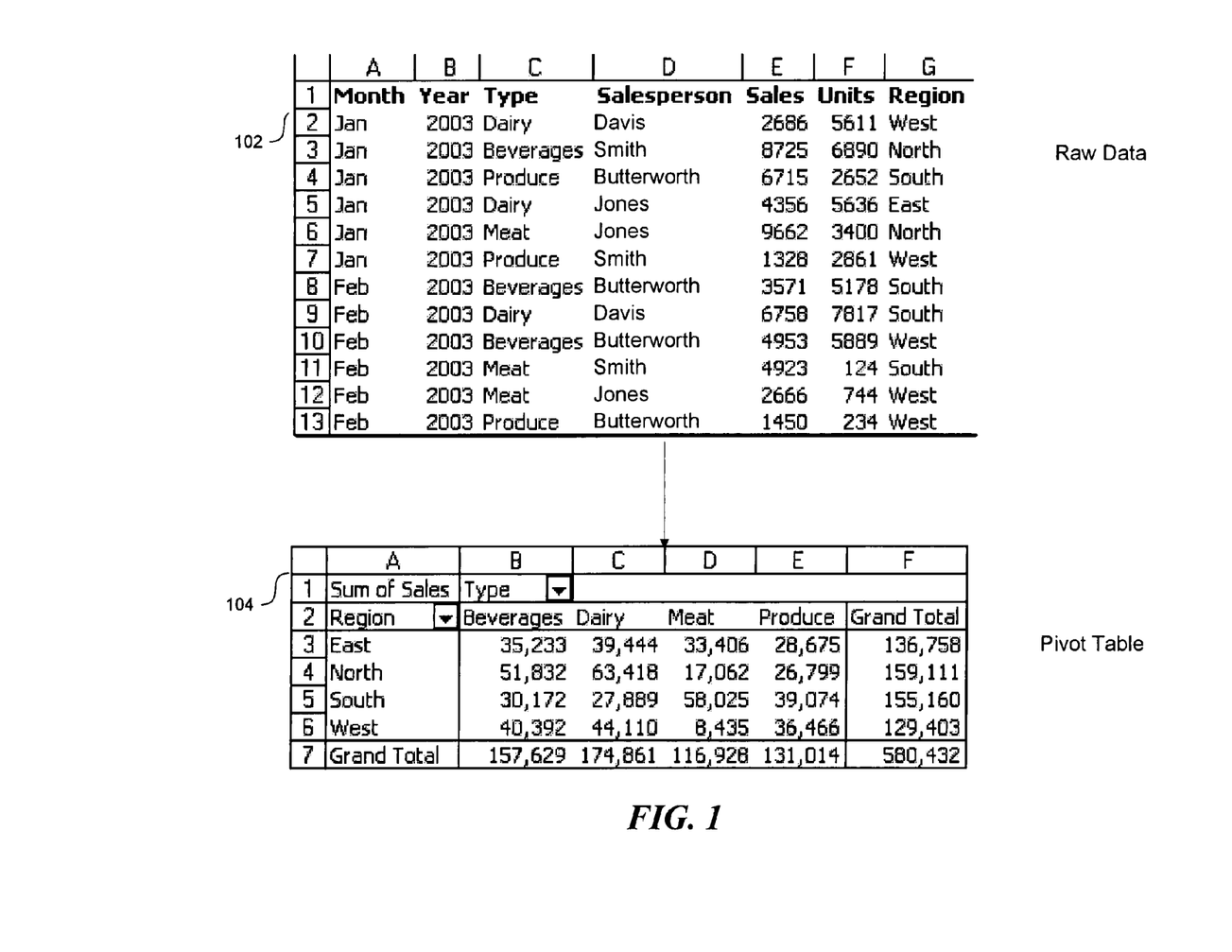
FIG. 1 is a table diagram showing an example of data utilized by aspects of the data diagram facility in an embodiment.

Current data management tools provide users with a wide variety of data storage and access techniques that allow users to enter, modify, and access data. More advanced data management techniques, such as pivot tables, custom reports, and other technologies such as Lotus Symphony™, provide users with a flexible way to aggregate, break down, and analyze sets of data. In general, a pivot table is a data table that contains data derived from another table (e.g., aggregation or summarization). An example of a pivot table is shown in FIG. 1. In addition to a pivot table 104, FIG. 1 also shows an example of a raw data list 102 (e.g., data in an Excel table) used to generate the pivot table 104. The raw data list 102 contains information relating to sales of types of grocery products (e.g., dairy, beverages, produce, and meat). According to the raw data list, the sales take place in one of four regions (e.g., north, south, east, and west) over a period of time. The raw data list 102 also shows unit information for the sale of grocery products. Once converted into the pivot table 104, the information of the raw data list 102 is organized according to region and type of grocery product. The pivot table 104 shows totals for each grocery product type and for each region. Also, the pivot table 104 displays grand totals for all the regions and for all the types of grocery products.

As illustrated in FIG. 1, pivot tables can be a useful tool for presenting data. Customizable report tables may provide similar advantages. Some data tools even provide a graphical or diagrammatical display of raw and/or manipulated data based on output provided by a previously generated pivot table or report. However, pivot tables, report filters, and similar tools are often difficult to use. For example, users may have to go through several steps to specify parameters for the pivot table or report, especially in cases involving large data sets. In addition, users may have trouble conceptualizing the contents and organization of data to be presented in the pivot table or report, making it even more difficult to specify parameters. Also, due to limitations in current software, it may be difficult to produce a visually compelling output.

SUMMARY

In some embodiments, a data diagram software facility provides customizable data diagrams. The facility may receive a reference to a multidimensional data set on which to base an initial data diagram. Based, at least in part, on this information, the facility may generate a data diagram providing a graphical representation of a node or nodes corresponding to data from the multidimensional data set. The facility may display the data diagram, which can be modified by a user. For example, the facility may provide tools that allow the user to change the order of the nodes of the data diagram, change the shape of the nodes of the data diagram, change the color or format of the nodes of the data diagram, etc. The facility may also provide functionality that allows the user to drill down on aspects of the data diagram based on a breakdown scheme.

DETAILED DESCRIPTION

The invention will now be described with respect to various embodiments. The following description provides specific details for a thorough understanding of, and enabling description for, these embodiments of the invention. However, one skilled in the art will understand that the invention may be practiced without these details. In other instances, well-known structures and functions have not been shown or described in detail to avoid unnecessarily obscuring the description of the embodiments of the invention.

It is intended that the terminology used in the description presented be interpreted in its broadest reasonable manner, even though it is being used in conjunction with a detailed description of certain specific embodiments of the invention. Certain terms may even be emphasized below; however, any terminology intended to be interpreted in any restricted manner will be overtly and specifically defined as such in this Detailed Description section.

I. Overview

A data diagram software facility provides users with a tool for accessing and presenting data from a multidimensional data source, such as an OLAP (on-line analytical processing) database or a relational data source. In some embodiments, the data diagram facility provides users with flexible and dynamic data diagrams that can be customized according to a user's needs. A data diagram is a graphical representation of the data in a data set. For example, the raw data list 102 of FIG. 1 may be presented graphically as a tree structure with a title of the data diagram at the root node, the regions represented as second-level nodes, and the types of products represented as third-level nodes. By selecting various nodes of the data diagram, the user can view various levels of detail of the underlying data set.

The data diagrams may be displayed in multiple formats with a tree structure being one example. The data diagram facility may then allow a user to customize data diagrams using techniques such as selection, dragging and dropping, and cutting and pasting. For example, the data diagram facility may allow a user to combine the beverages and dairy nodes under the north region by selecting those nodes and selecting a "combine" option. The facility may then adjust the displayed data diagram to show that the nodes have been combined. In this way, the user can manipulate and customize a data diagram so that it meets a desired (e.g., presentation-quality) format. The customized data diagram may retain active links to the underlying data. Accordingly, the user can continue to manipulate the customized data diagram (e.g., during a second session) while still retaining an accurate portrayal of the underlying data. Also, by retaining active links to the underlying data, the data diagram facility can refresh information in the customized data diagram, ensuring that the most recent data is presented.

In some embodiments, the data diagram facility is implemented within a framework of a drawing application (e.g., Microsoft Visio). To create an initial data diagram, in some embodiments, a user connects to an appropriate data source (e.g., an OLAP database (or other multidimensional data source) or a relational database). A user interface associated with the data diagram facility allows the user to select parameters of interest for the initial data diagram. For example, the user may select that the initial data diagram should include a node for each region of FIG. 1 at the second level and a node for each type of grocery product at the third level. The data diagram facility then generates the initial data diagram. The user may customize the initial data diagram using tools, including drawing tools. Later, the user may go back and refresh the data while still retaining any visual effects and data organization schemes created using the drawing tools.

II. User Interface

Figure 2:
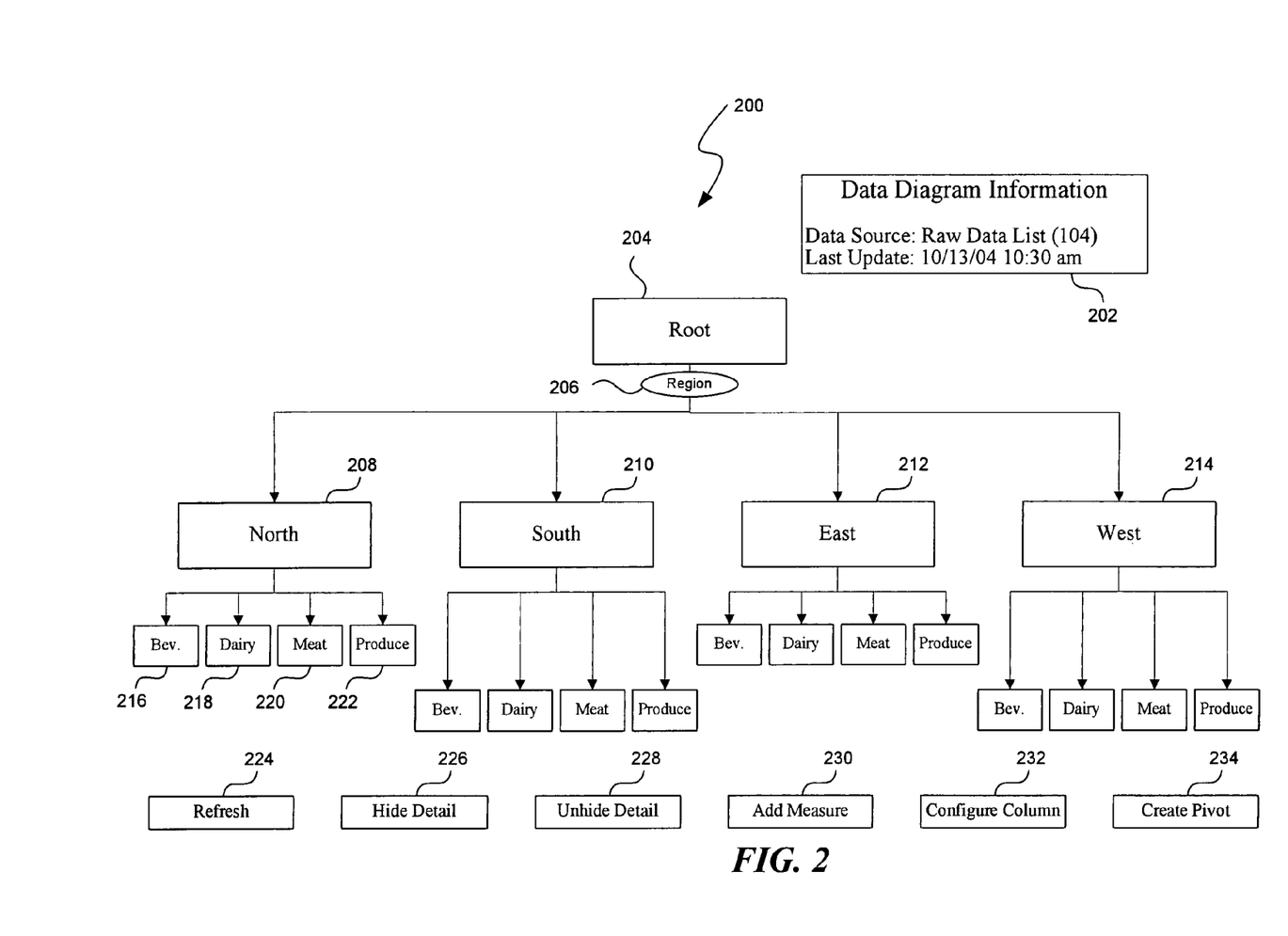
FIG. 2 is a sample data diagram generated by aspects of the data diagram facility in an embodiment.

FIG. 2 shows an initial data diagram 200 generated by the data diagram facility. For the purpose of illustration, the initial data diagram is based on information from a data source, such as the raw data list 102 of FIG. 1. As illustrated in FIG. 2, the data diagram may include an information box 202 that indicates the data source (e.g., "Raw Data List (104)") and a last-updated time and date (e.g., "Oct. 13, 2004 10:30 A.M.").

In some embodiments, the data diagram 200 is shown as a hierarchy with a root node 204 at the top. Alternatively, the node at the top of the hierarchy may be a title node, indicating a title for the information in the data diagram. In some embodiments, the data diagram facility provides a dimension shape 206 that indicates a particular dimension of the hierarchy. For example, the dimension shape 206 may specify the breakdown scheme for the next level of the hierarchy (e.g., if the dimension node specifies "region," the next level of the hierarchy shows the regions "north," "south," "east," and "west").

In the illustrated example, the data diagram 200 is broken down by region (e.g., north, south, east, and west). Accordingly, region information is displayed one level below the root node 204. For example, a node 208 corresponds with a north region, a node 210 corresponds with a south region, a node 212 corresponds with an east region, and a node 214 corresponds with a west region. In some embodiments, the user may select a node (e.g., east), then break that single node down. The user may also do the same for the entire level or set of nodes. For example, in the illustrated embodiment, the next level down in the data diagram 200 consists of nodes representing grocery product types. For example, a node 216 represents a beverages type, a node 218 represents a dairy type, a node 220 represents a meat type, and a node 222 represents a produce type. These same nodes are repeated for each of the respective regions. However, whether this type of symmetry is present may depend on the underlying data set and on the parameters that the user selects. For example, if no meat is sold in the north region, then the data diagram might have no meat node under the north node.

In some embodiments, the facility may provide two general categories of functions: functions that affect the entire data diagram and functions that affect only selected portions of the data diagram. Examples of functions that the data diagram facility may perform on the whole data diagram include a REFRESH function 224 that refreshes information displayed in the data diagram 200 based on any changes that may have taken place in the underlying data. In most cases, executing this function does not alter any user changes to the data diagram.

A HIDE DETAIL function 226 may hide details in the data diagram so that the user can simplify the view. An UNHIDE DETAIL function 228 displays detailed information in the data diagram 200 that has been hidden (e.g., as a result of performing the HIDE DETAIL function 226). For example, the user may select the HIDE DETAIL function 226 to remove the display of the grocery product type nodes and the UNHIDE DETAIL function 228 to redisplay the details.

An ADD MEASURE function 230 allows users to display database measures, which are currently not being shown in the display diagram 200. Measures may consist of numbers in a spreadsheet (e.g., dollars, profit, hours, etc.) to which different types of aggregations can be applied (e.g., sum, average, minimum, maximum, etc.). For example, a user may want to add the "sales" measure of the raw data list to the region nodes to display the total sales for that region. In some embodiments, measures can be combined into calculated measures that allow users to view data across different time periods or calculate percentage type data. Calculated measures (sometimes called "calculated members" in OLAP databases) typically involve applying formulas to multidimensional data. For example, a user may add a calculated measure to the region nodes that display the percentage of the total sales that are from that region. In some embodiments, the invention may allow a user to add or remove measures from nodes in a diagram at any time. In some embodiments, a user interface of the data diagram facility is configured such that users do not need to understand the difference between dimensions (e.g., columns) and measures. Instead, a user may click on a button to get the information he or she wants, including both measure information and dimension information.

Via a drill down window, the user may select the columns (i.e., dimensions) that the he or she would like to view on the data diagram (e.g., month, year, type, salesperson, sales, units, region, etc.). For example, if a user would like to display the sales people in each region, the user may provide a select a salesperson dimension from the drill down window. A CONFIGURE COLUMN function 232, when selected, provides facilities for further customization of selected dimensions.

In some embodiments, a CREATE PIVOT TABLE function 234 allows the user to create a pivot table based on the information as it is displayed in the data diagram 200. For example, a single click allows a user to automatically generate pivot tables that represent a non-diagrammatic view of the same underlying data. In another example, the CREATE PIVOT TABLE function 234 includes an option to display information in an Excel spreadsheet.

Figure 3:
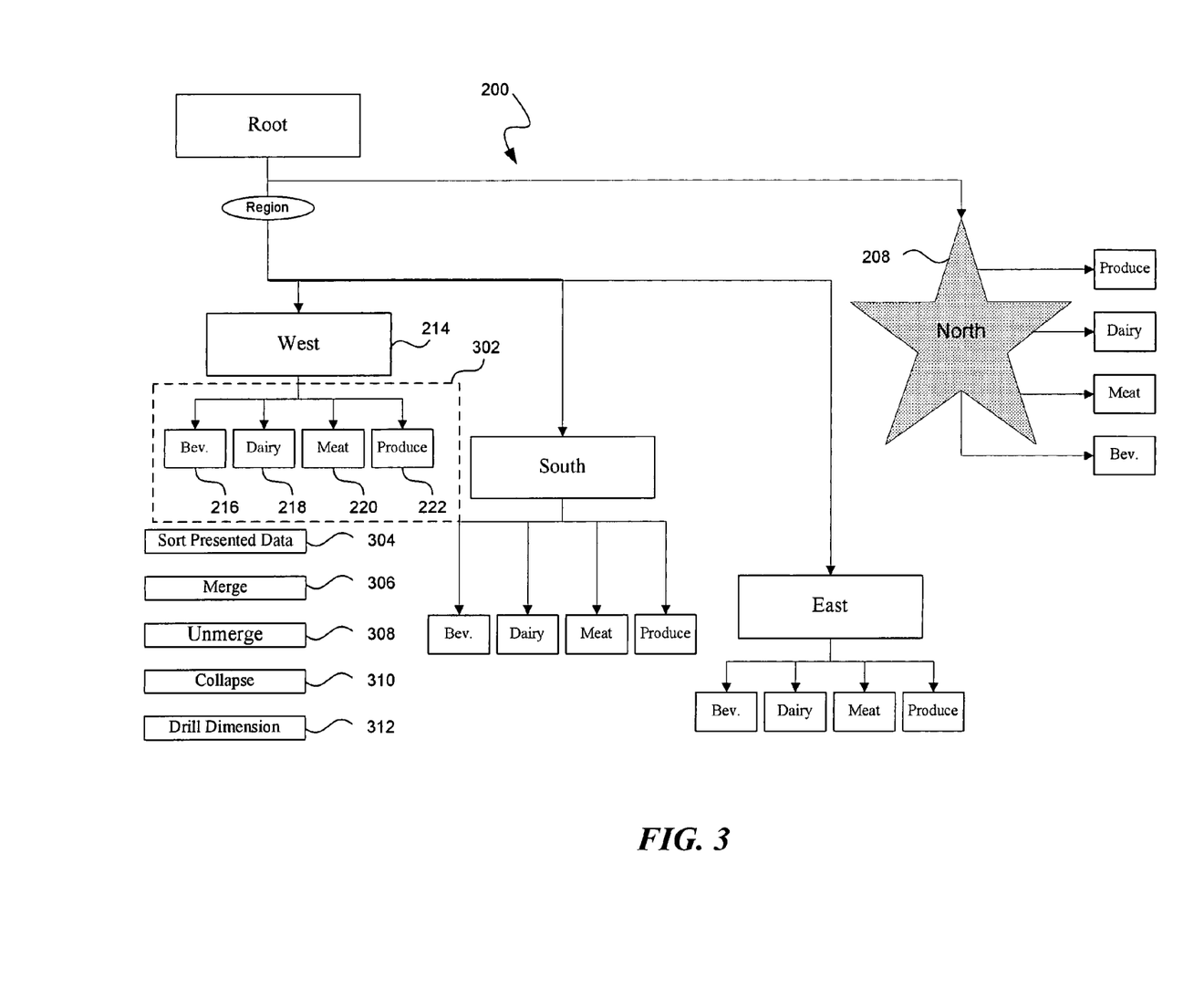
FIG. 3 shows the data diagram of FIG. 2 after it has been modified from its initial form using user interface aspects of the data diagram facility in an embodiment.

FIG. 3 shows the data diagram 200 after it has been modified by a user from its initial form. As shown, the user has modified the north region node 208 to resemble a star configuration using, for example, a drawing tool. In this way, the user can, for example, emphasize that the north region has the highest sales relative to the other regions. While the user, in some embodiments, may modify one or more of the shapes in the data diagram 200 for visual effect, the underlying data and its internal relationships remain unchanged. Other changes that the user may make to the data diagram 200 (e.g., using drawing tools) may include the rearranging of nodes (e.g., using drag and drop techniques), the addition or modification of color, the addition or modification of labels, the addition of animation effects, the addition or modification of fonts or styles, etc.

As shown using a selection box 302 illustrated in FIG. 3, in some embodiments, the user may select one or more of the nodes of the data diagram 200 on which to perform specific functions or operations. The user may select these nodes via a variety of techniques such as dragging the selection box 302 over the selected nodes (as shown in FIG. 3), clicking on select nodes to highlight them, etc. In the illustrated embodiment, the user has selected the beverages node 216, the dairy node 218, the meat node 220, and the produce node 222 by using the selection box 302.

As described above with respect to FIG. 2, in some embodiments, the facility may provide two general categories of functions: functions that affect the entire data diagram and functions that affect only selected portions of the data diagram. Some of the actions that the data diagram facility may perform on selected portions of the data diagram include a SORT PRESENTED DATA function 304, a MERGE function 306, an UNMERGE function 308, a COLLAPSE function 310, and a DRILL DIMENSION function 312. For example, if the data diagram is displaying grocery type information for both a first region and a second region, but the user only wishes to view grocery type information for the second region, the user may select the node corresponding to the first region and then select the COLLAPSE function 310.

The data diagram facility may also provide tools that allow the user to copy one or more nodes in the data diagram 200 to create a new instance of the data diagram 200. In this way, the user can easily manipulate the same data diagram in many different ways. In some embodiments, the new instance of the diagram may be displayed in the same view or window as the original instance or in a separate view or window.

In accordance with the DRILL DIMENSION function 312, the data diagram facility may allow the user to manipulate how the data diagram presents dimensions of a multidimensional database. Dimensions generally include the categories used for columns and/or rows of the data table. Examples of dimensions include month, year, type, salesperson, region, product, time, store, customer age, customer income, employee, etc. In some cases, dimensions have levels (or subcategories). For example, the dimension of time may have a year level, a month level, a day level, an hour level, a minute level, and a second level. The levels of a dimension allow users to drill down with respect to that dimension. For example, if the user notices that sales are higher in a particular month, the user may want to drill down to a week or day level to see if sales were higher in a particular part of the month. Similarly, the user may want to drill up to a higher level (e.g., year), to see if data patterns are valid on a wider scale. For example, to drill up, the user may change the level he or she originally drilled on from week to year. In many cases, the levels of a dimension may be organized into hierarchies.

Figure 4:
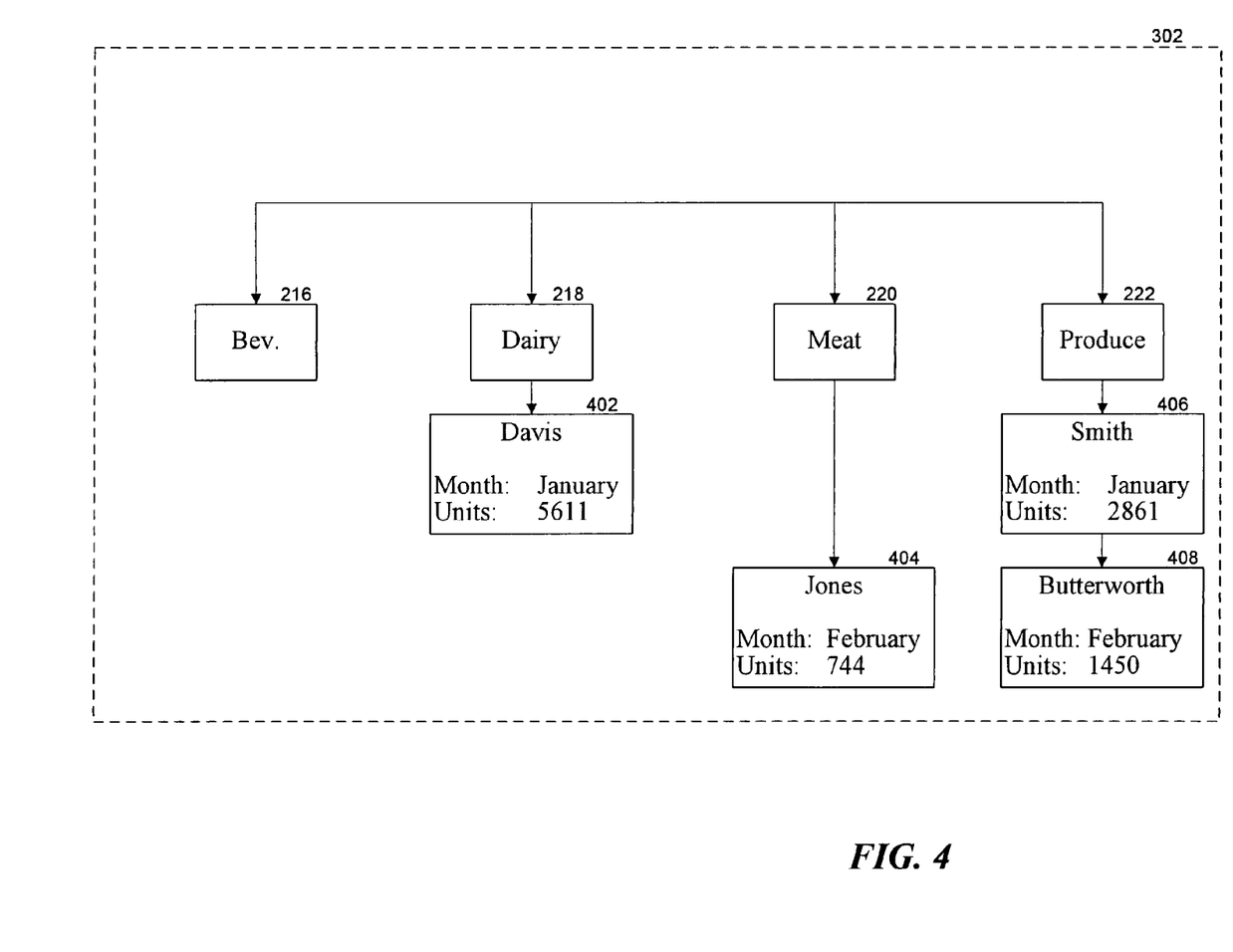
FIG. 4 shows aspects of the data diagram of FIG. 3 after a drill dimension function is applied in an embodiment.

FIG. 4 shows the result of the DRILL DIMENSION function 312 of FIG. 3, as applied to the selection of nodes 302. The selected nodes in this case include the beverages node 216, the dairy node 218, the meat node 220, and the produce node 222. In some embodiments, the data diagram facility provides the user with a dialog box or other input tool (not shown) that allows the user to select desired dimensions and levels.

When the DRILL DIMENSION function 312 is applied to the selected nodes (216, 218, 220, and 222) as specified by the user, the result is a display of the next level of the dimensions associated with the selected nodes. For example, in the illustrated embodiment, the data diagram 200 displays nodes showing monthly sales in each region for each of the respective grocery type categories. For example, a sales representative named Davis sold 5,611 units of dairy in January as represented in node 402. Likewise, a sales representative named Jones sold 744 units of meat in the month of February as shown in node 404. A sales representative named Smith sold 2,861 units of produce in January as shown in node 406, and a sales representative named Butterworth sold 1,450 units of produce in February as shown in node 408.

In some embodiments, multiple drill down instances may be created for a single data diagram, and each instance may be maintained and updated separately.

III. Data Structures

Figure 5:
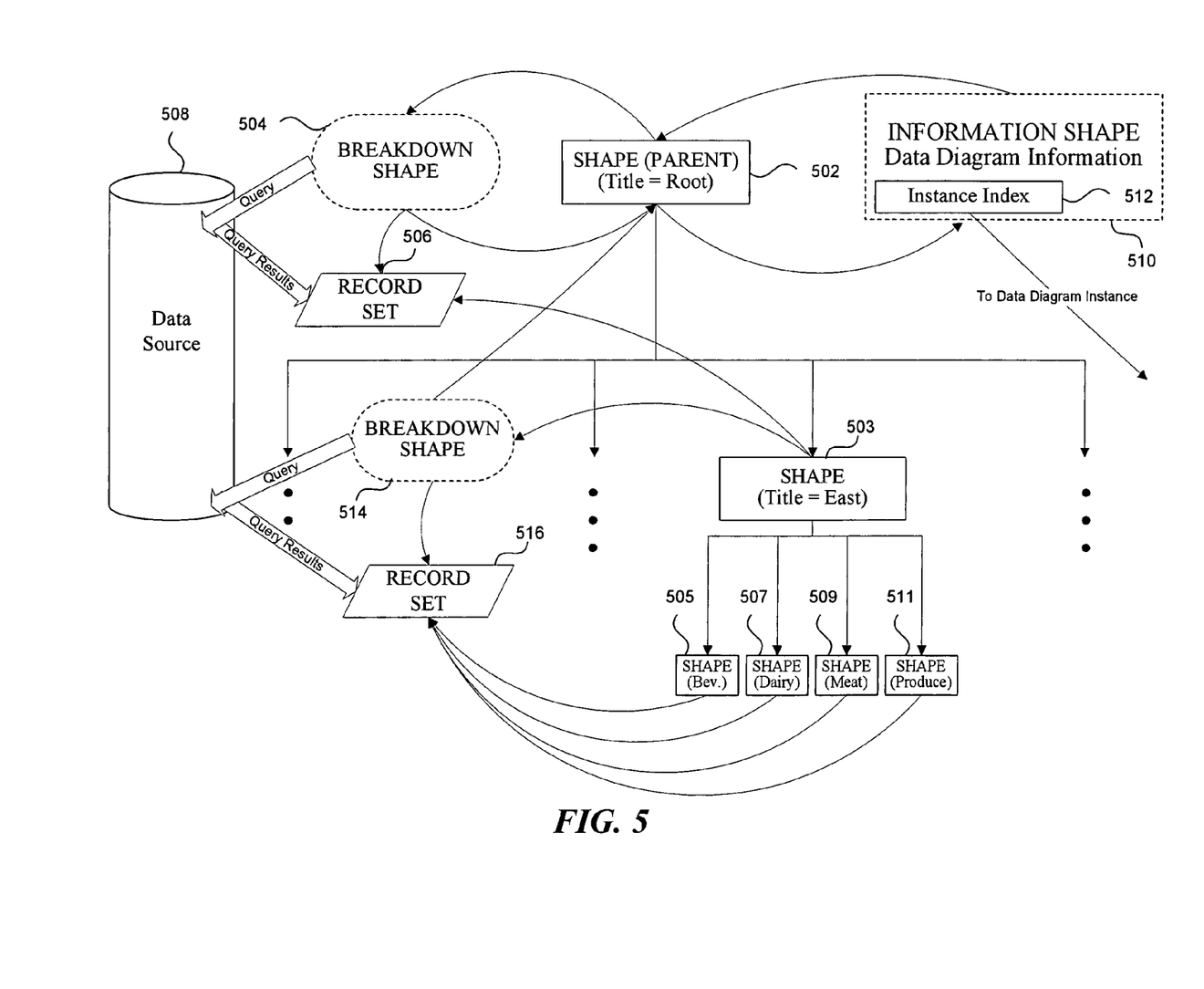
FIG. 5 shows a collection of underlying data structures that may be used to implement the data diagram facility in an embodiment.

FIG. 5 shows a collection of underlying data structures that may be used to implement the data diagram facility. For illustrative purposes, the data structures are shown as they would be configured to produce the data diagram 200 of FIG. 2. However, one skilled in the art would understand that the invention could be implemented using different data structures, or the same data structures in different combinations.

The data structures used to generate a data diagram of the illustrated embodiment may include shape objects 502, breakdown shape objects (504 and 514), recordset objects (506 and 516), and information shape objects 510.

The shape objects 502 may be used to implement the nodes that the data diagram displays. For example, the shape objects (502, 503, 505, 507, 509, and 511) may be used to display the root node of the data diagram of FIG. 2, as well as the region nodes (e.g., north, south, east, west) and the grocery product type nodes (beverages, dairy, meat, produce). The shape objects (502, 503, 505, 507, 509, and 511) may each include a Boolean value about whether the shape is a root shape, a reference to a data diagram information shape 510 (described below), a Boolean value that represents whether the shape has children or not, a reference to a breakdown shape if the shape has children, a Boolean value that shows whether the shape is an aggregate of shapes on the same breakdown level, a Boolean value that shows whether the shape is part of a merge shape (indicating that the shape is hidden on the data diagram), and a reference to a merge shape (if the shape is part of a merge).

The shape objects (502, 503, 505, 507, 509, and 511) may also contain references to the information (e.g., the particular set of dimensions, measures, and relational information) that the shape displays when implemented as a node in a data diagram. For example, each shape may contain a reference or pointer to a recordset object (506 or 516). The recordset object (506 or 516) may include a set of data from an underlying data source 508, such as row and column information. In some embodiments, the set of data that the recordset object (506 or 516) contains may be based on a query performed by a corresponding breakdown shape object (504 or 514). In some implementations, each row of the recordset object (506 or 516) may pertain to one shape object (502, 503, 505, 507, 509, or 511) in the data diagram. The recordset object (506 or 516) may provide a flexible way to manipulate select data from the data source 508, as it can be easily refreshed and includes a set of methods that allow access to its data. However, it is possible to implement the invention using other techniques.

As described above, the breakdown shape objects (504 and 514) may provide queries to generate recordset objects (506 and 516). In general, each breakdown shape object (504 and 514) provides information about one breakdown (e.g., sales by region, sales by product type) in a data diagram. Accordingly, the data diagram may have one breakdown shape object (504 or 514) for each level in the data diagram (in addition to the root). For example, the breakdown shape object 504 corresponding to the root node 204 in the data diagram of FIG. 2 may provide an indication of what the next level down in the hierarchy should be (e.g., regions). After performing the query results in a recordset object 506 corresponding to the breakdown shape object 504, the breakdown shape object 504 may include a pointer or reference to the corresponding recordset object 506. In general, while the breakdown shape objects (504 and 514) may not be displayed or visible as shapes or nodes on the data diagram itself, an indication of the breakdown scheme that a breakdown node represents may be displayed.

An information shape object 510 may be used to hold information about the data diagram as a whole. This information may include, for example, information about the layout of the data diagram and about the data source of the data diagram. In addition, the types of data in a data diagram information shape object 510 may include a shape reference identifying the root shape for the data diagram 502, an instance index 512 for the data diagram, and connection information (not shown) that may be used to create a new data diagram via a copy/paste action. The instance index 512 may facilitate separate displayable instances of the data diagram, so that a user is allowed to manipulate multiple instances separately. Accordingly, the instance index 512 may include a reference or pointer to one or more data diagram instances.

IV. Process Flows

Figure 6:
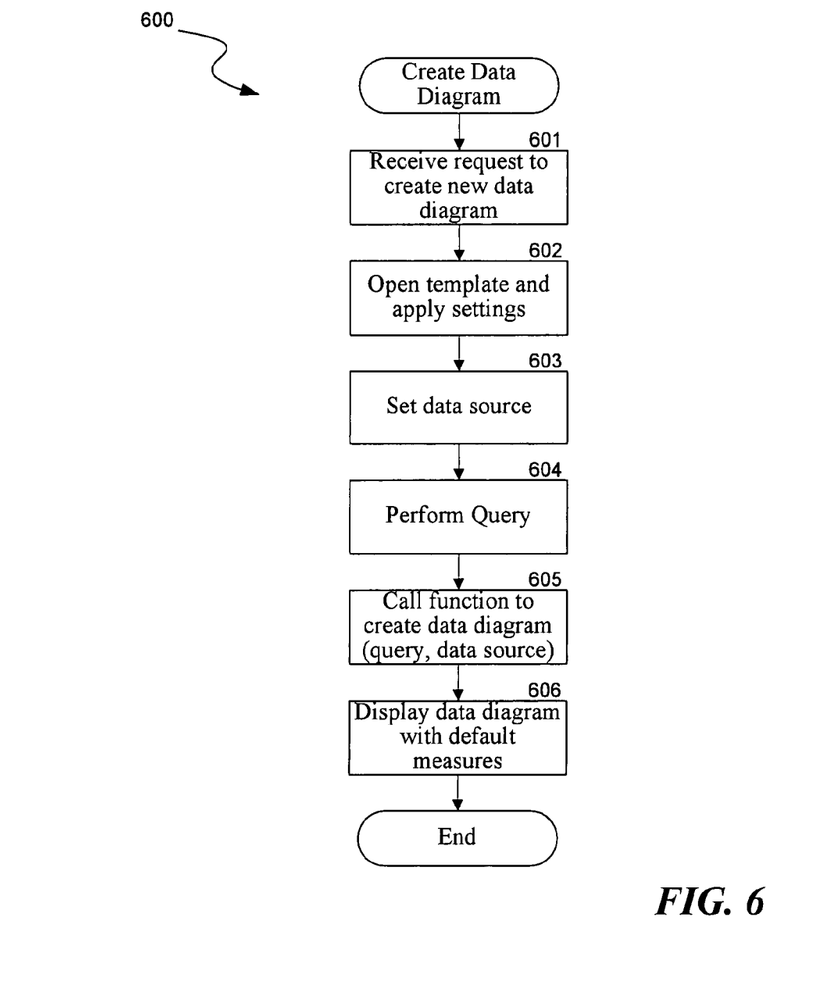
FIG. 6 is a flow diagram showing an example of a routine for creating a data diagram based on multi-dimensional data in an embodiment.
Figure 7:
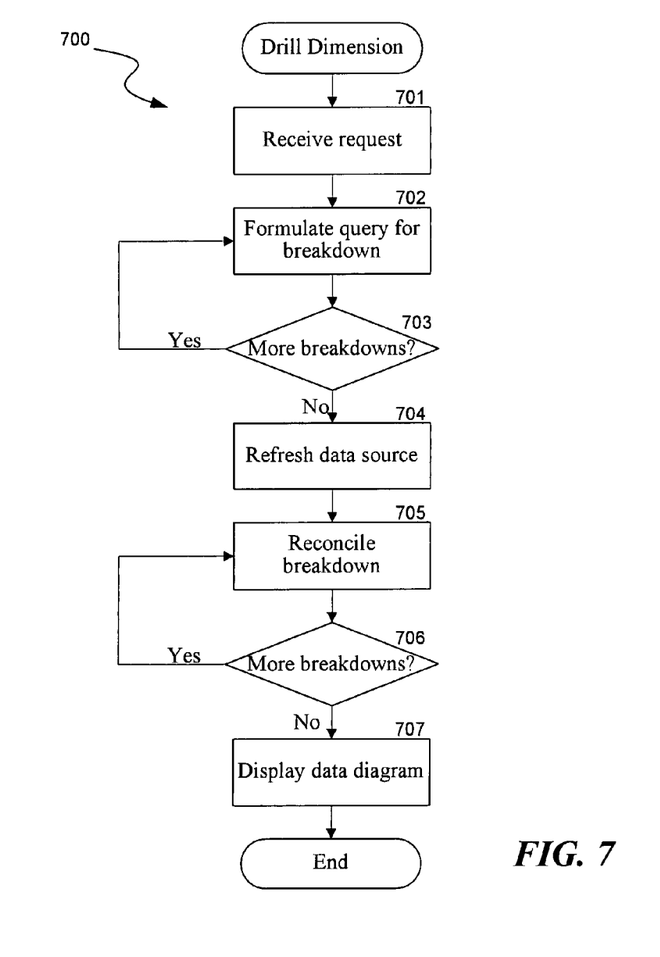
FIG. 7 is a flow diagram showing an example of a drill dimension routine performed on a current data diagram in an embodiment.

FIGS. 6 and 7 are representative flow diagrams that show processes of the data diagram facility. These flow diagrams do not show all functions or exchanges of data but, instead, provide an understanding of commands and data exchanged under the system. Those skilled in the relevant art will recognize that some functions or exchanges of commands and data may be repeated, varied, omitted, or supplemented, and other aspects not shown may be readily implemented.

FIG. 6 is a flow diagram showing an example of a routine 600 for creating a data diagram based on multidimensional data in an embodiment of the invention. At block 601, the routine 600 receives a request to create a new data diagram. The request may include information provided by a user, such as a designation of a data source and information relating to the general contents and format of the data diagram. At block 602, the routine 600 opens a template in an associated drawing application and applies initial settings according to the provided information. For example, the template may provide a view in which the data diagram can be graphically displayed and manipulated and may provide a set of stencils, macros, and page settings configured especially for manipulating data diagrams.

At block 603, the routine 600 sets the data source for the new data diagram according to the designation of the user. At block 604, the routine 600 generates a summary query for performing on the data source. In some embodiments, the summary query may be based, at least in part, on metadata provided by the data source.

At block 605, the routine 600 calls a function to create the data diagram, passing in the summary query and the data source as parameters. The create data diagram function may create the diagram by performing a series of steps. For example, the create data diagram function may first instantiate an information shape object, a title shape object, and a data diagram instance object. The create data diagram function may then specify one or more data sets for the data diagram by querying the designated data source. Once the data set is specified, the create data diagram function may generate one or more child shape objects that are each linked to a row in the data set.

At block 606, the routine 600 displays the data diagram. For example, the routine 600 may call a layout function that performs this task. The layout function may be associated with a drawing program such as Microsoft Visio. Once the basic data diagram is created with default measures, the user has the option to modify the data diagram as shown, for example, in FIGS. 2 through 4.

FIG. 7 is a flow diagram showing an example of a drill dimension routine 700 performed on a current data diagram. At block 701, the routine 700 receives a request for drilling down for a selected set of nodes. At block 702, the routine 700 formulates a query for the breakdown of the next node. At decision block 703, the routine 700 checks whether there are more nodes to break down. If there are additional nodes to break down, the routine 700 loops back to block 702 to formulate a query for the breakdown of the next node. If however, there are no additional nodes to break down, the routine 700 continues at block 704 where the routine 700 refreshes the data source. In some embodiments, the refreshing of the data source may invoke all the queries for the entire drill down.

After the refreshing, it may be possible to create new shapes based on the performed breakdowns. In some embodiments, this is performed by reconciling the data diagram. Accordingly, at block 705, the routine 700 may reconcile the next breakdown. This may involve creating a shape for each row in a record set that results from executing the queries formulated at block 702. At decision block 706, the routine 700 determines whether there are more breakdowns to reconcile. If, at decision block 706, there are more breakdowns to reconcile, the routine 700 loops back to block 705 to perform the reconciliation of the next breakdown. If, however, at decision block 706, there are no further breakdowns to reconcile, the routine 700 then proceeds to block 707 to display the output data diagram. For example, this may involve calling a layout function that draws the figures on the screen as previously arranged by the user.

V. Representative System

Figure 8:
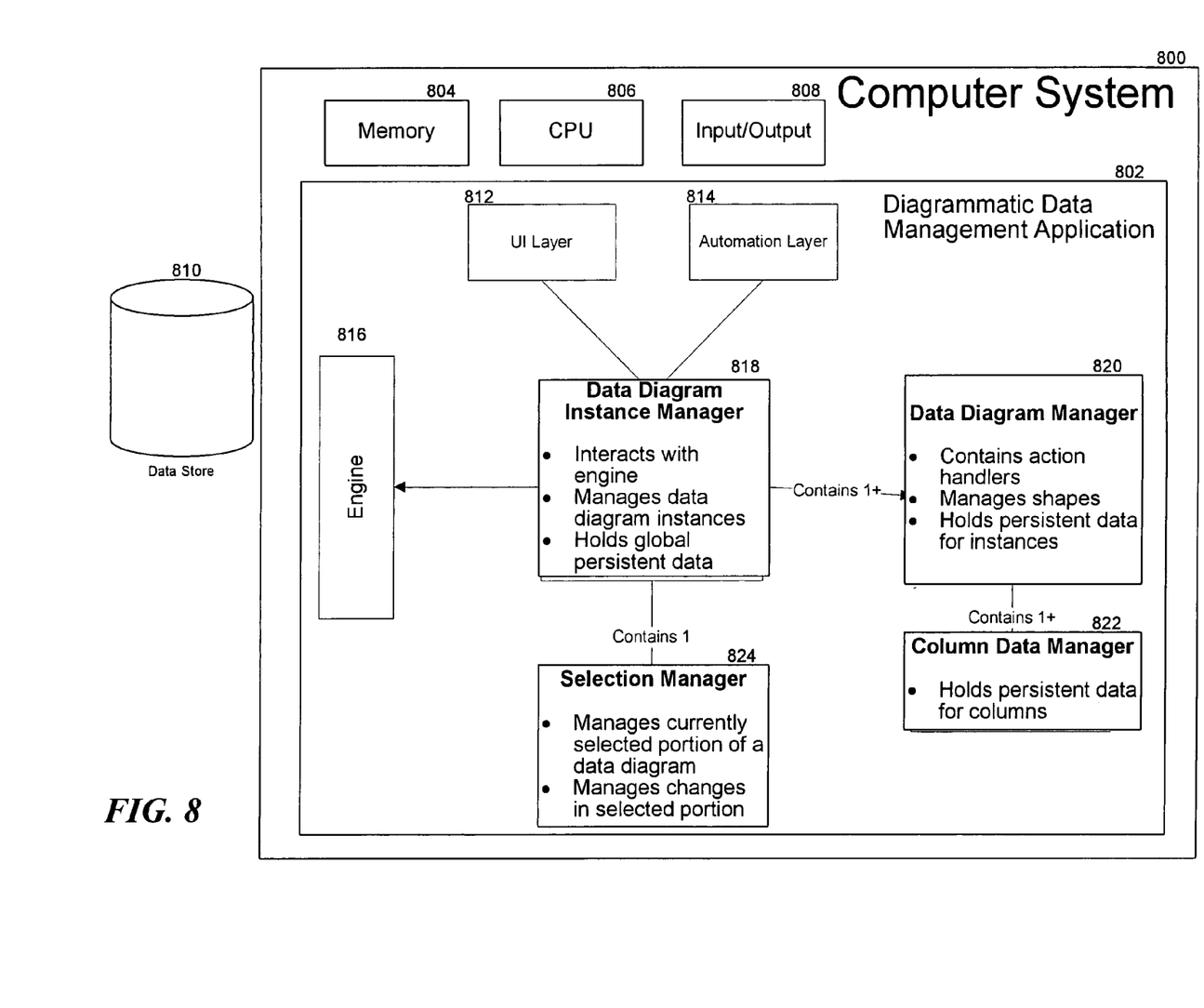
FIG. 8 is a block diagram showing an example of a suitable environment in which aspects of the data diagram facility can be implemented.

FIG. 8 and the following discussion provide a brief, general description of a suitable environment in which the invention can be implemented. Although not required, aspects of the invention are described in the general context of a computer system that executes instructions, such as routines executed by a general-purpose computer (e.g., a server computer, wireless device, or personal/laptop computer). Those skilled in the relevant art will appreciate that the invention can be practiced with other communications, data processing, or computer system configurations, including Internet appliances, handheld devices (including personal digital assistants (PDAs)), wearable computers, all manner of cellular or mobile phones, embedded computers (including those coupled to vehicles), multiprocessor systems, microprocessor-based or programmable consumer electronics, set-top boxes, network PCs, minicomputers, mainframe computers, and the like.

Aspects of the invention can be embodied in a special-purpose computer or data processor that is specifically programmed, configured, or constructed to perform one or more of the computer-executable instructions explained in detail herein. Aspects of the invention can also be practiced in distributed computing environments where tasks or modules are performed by remote processing devices, which are linked through a communication network. In a distributed computing environment, program modules may be located in both local and remote memory storage devices.

Aspects of the invention may be stored or distributed on computer-readable media, including magnetically or optically readable computer disks, as microcode on semiconductor memory, nanotechnology memory, organic or optical memory, or other portable data storage media. Indeed, computer-implemented instructions, data structures, screen displays, and other data under aspects of the invention may be distributed over the Internet or over other networks (including wireless networks), on a propagated signal on a propagation medium (e.g., an electromagnetic wave(s), a sound wave, etc.) over a period of time, or may be provided on any analog or digital network (packet switched, circuit switched, or other scheme).

In some embodiments, the data diagram facility implemented as part of a drawing application includes a template, a stencil containing dedicated shapes, and a drawing application add-on containing code implementing the functionality. However, one skilled in the art would recognize that the same fundamental architecture could be implemented in other ways. For example, implementation may be internal to the drawing application itself. In some embodiments, the invention allows a user to connect to an OLAP cube Excel spreadsheet or database and interactively drill down into that data to produce drawings. The user may configure the drawings according to user preference. The manipulations of the drawings are similar to what could be achieved using a pivot table.

FIG. 8 shows a representative computer system 800 in which a data diagram 802 facility may be implemented. The computer system 800 may contain a memory 804, a CPU 806, and one or more IO devices 808 (e.g., keyboard, speakers, display screen, etc.). The data diagram facility 802 may pull data from a data store 810 for creating data diagrams as described with respect to FIGS. 2 through 7. The data store 810 may be external to the computer system 800 (as shown). Alternatively, the data store 810 may be contained within the computer system 800. The data diagram facility 802 may contain a UI layer 812, an automation layer 814, and an engine component 816. A data diagram instance manager 818 interacts with the engine component 816 to manage data diagram instances and holds global data relating to data diagram instances. For example, the data diagram instance manager 818 may allow a user to create multiple instances of the same data diagram and then modify each instance separately.

A data diagram manager component 820 contains action handlers for creating and performing actions on data diagrams. In general, the data diagram manager 820 manages data diagram instances and shapes within the data diagram instances. In addition, it may hold persistent data for instances of data diagrams. The data diagram manager 820 may contain one or more instances of a column data manager 822 which holds persistent data for columns within the data diagram, thus allowing for actions such as drill down, as shown and described with respect to FIGS. 4 and 7.

A selection manager 824 associated with the data diagram instance manager 818 observes the user's selection and determines which drill down actions are valid for a current selection. In some embodiments, this facilitates providing feedback to the user by disabling invalid actions (e.g., graying out buttons in the user interface).

CONCLUSION

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list, and any combination of the items in the list. The term "data" is used herein in its collective sense, and may mean a set of one or more datum.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times. Where the context permits, words in the above Detailed Description using the singular or plural number may also include the plural or singular number, respectively, where the context permits.

The teachings of the invention provided herein can be applied to other systems, not necessarily the system described herein. The elements and acts of the various embodiments described above can be combined to provide further embodiments.

These and other changes can be made to the invention in light of the above Detailed Description. While the above description details certain embodiments of the invention and describes the best mode contemplated, no matter how detailed the above appears in text, the invention can be practiced in many ways. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

While certain aspects of the invention are presented below in certain claim forms, the inventors contemplate the various aspects of the invention in any number of claim forms. For example, while only one aspect of the invention is recited as embodied in a computer-readable medium, other aspects may likewise be embodied in a computer-readable medium. Accordingly, the inventors reserve the right to add additional claims after filing the application to pursue such additional claim forms for other aspects of the invention.

We claim:

1. A method for providing a diagrammatical display of data stored in a multidimensional data set, the method comprising:
   receiving a reference to the multidimensional data set;
   generating a multi-level data diagram, wherein the data diagram provides a graphical representation of nodes, and wherein the nodes correspond to data from the multidimensional data set, the data diagram being represented by a data structure that has a shape object for each node of the data diagram indicating shape of the node, a breakdown shape object for each level of the data diagram, and an information shape object for the data diagram, a shape object indicating whether the node is a root node, whether the node has child nodes, whether the node represents an aggregate of nodes at the same level, and whether the node is part of a merged node;
   displaying the data diagram based on information of the data structure;
   generating a first pivot table corresponding to the displayed data diagram based on organization of the data diagram indicated the shape objects and the breakdown shape objects;
   displaying the generated first pivot table;
   receiving requests to modify the data diagram, the requests including a request to add a column to the data diagram, a request to hide detail of the data diagram, and a request to modify the graphical representation of a node;
   modifying the data diagram based on the received requests by modifying information of the shape objects of the data structure including modifying a shape object to indicate the modified graphical representation and to indicate that the node is merged and modifying a shape breakdown object to indicate the added column;
   displaying the modified data diagram based on information of the modified data structure at the user interface;
   refreshing the modified data diagram, wherein the refreshing includes querying the multidimensional data set;
      determining if changes have been made to the multidimensional data set since the data diagram was generated; and
      if changes have been made to the multidimensional set, updating the data diagram based on the changes, wherein the updating retains the modified graphical representation of nodes;
   generating a second pivot table corresponding to the modified data diagram as refreshed wherein the pivot table factors in the request to hide detail and the request to add a column as derived from the modified data structure including whether a shape object has been merged and whether a shape breakdown object indicates a new column; and
   displaying the generated second pivot table.

2. The method of claim 1 wherein the requests to modify the data diagram include a request to reposition at least one node in the data diagram.

3. The method of claim 1 wherein the requests to modify the data diagram include a request to change an appearance feature of at least one node in the data diagram.

4. The method of claim 1 wherein the requests to modify the data diagram include a request to duplicate at least one node in the data diagram to generate a new instance of the diagram.

5. The method of claim 1 wherein the requests to modify the data diagram include a request to add a text comment to at least one node in the data diagram.

6. The method of claim 1 wherein the graphical representation of nodes includes nodes arranged in a tree-like hierarchy, and wherein the requests to modify the data diagram include a request to visually restructure the hierarchy.

7. The method of claim 1 wherein the data diagram is displayed in a user interface, and wherein the user interface includes access to one or more tools for modifying the graphical representation of the data diagram.

8. The method of claim 1
   wherein the data set includes a data dimension having multiple levels, and wherein the generated data diagram includes a display of a node associated with the data dimension,
   wherein the requests to modify the data diagram include a request to perform a drill down of the node associated with the data dimension,
   wherein the drill down includes displaying a set of nodes that corresponds to one of the multiple levels of the data dimensions, and
   wherein the set of nodes is not displayed in the data diagram prior to modification.

9. A system for displaying customizable data diagrams based on a multidimensional data set, the system comprising:
   a data store configured for storing one or more multidimensional data sets;
   a user interface layer configured for receiving references to the one or more multidimensional data sets and for receiving requests to modify a data diagram generated based on the one or more multidimensional data sets;
   a data diagram engine component configured for
      generating an initial data diagram that provides a graphical representation of nodes, wherein the nodes correspond to data from the one or more multidimensional data sets, each node having a reference to information of a multidimensional data set to which the node corresponds;
      modifying the data diagram based on a received request, wherein the modification includes modifying the graphical representation of nodes, the modifying including updating a data structure to indicate merging and splitting of nodes;
      refreshing the data diagram, wherein the refreshing includes using the references associated with the nodes to query the multidimensional data set for breakdowns of the nodes, determining if changes have been made to the referenced information of the multidimensional data set since the initial data diagram was generated, and if changes have been made to the referenced information of the multidimensional set, reconciling breakdowns by creating a shape for each row in a record set that results from a query and updating the data diagram based on the changes of the reconciled breakdowns, wherein the updating retains the modified graphical representation of nodes;
   a display component configured for displaying the initial data diagram and for displaying the modified data diagram;
   a component that generates a pivot table from data of the data store, the pivot table formatted in accordance with the modified data diagram to reflect merged and split nodes as indicated by the data structure: and
   a component that displays the generated pivot table.

10. The system of claim 9, further comprising a data diagram instance manager component in communication with the data diagram engine component, wherein the data diagram instance manager component manages instances of data diagrams.

11. The system of claim 9, further comprising a data diagram manager component, wherein the data diagram manager component handles actions to be performed on an instance of a data diagram.

12. The system of claim 9, further comprising a selection manager component, wherein the selection manager component manages modifications made to select portions of a data diagram.

13. The system of claim 9, further comprising a column manager component, wherein the column manager component holds persistent data for columns in a data diagram.

14. The system of claim 9 wherein the user interface layer provides tools associated with a drawing application.

15. A computer-readable storage or tangible medium containing a data structure used in generating a data diagram based on a set of raw data, the data structure comprising:

one or more instances of shape information, wherein each instance of the shape information is associated with a node displayed in the data diagram, wherein the displayed node corresponds to a dimension in the set of raw data, wherein each instance includes a reference to the dimension in the set of raw data to which the displayed node corresponds, and wherein the dimension includes at least one level of detail, the shape information being represented by a shape object for each node of the data diagram indicating shape of the node, a shape object indicating whether the node is a root node, whether the node has child nodes, whether the node represents an aggregate of nodes at the same level, and whether the node is part of a merged node; and one or more instances of breakdown shape information, wherein each instance of the breakdown shape information defines a breakdown scheme for a selected dimension in the set of raw data, wherein the breakdown scheme is used to drill down on data displayed in the data diagram, and wherein the drill down includes displaying one or more nodes showing a next level of detail for the selected dimension;

and wherein the data diagram is configured to be refreshed including using the reference of each instance of shape information to query the raw data to determine if changes have been made to the raw data since the data diagram was generated, and if changes have been made to the raw data, reconciling breakdowns by creating a shape for each row in a record set that results from a query and updating the data diagram based on the changes, wherein the updating retains the breakdown scheme; and wherein the data structure is used to generate a pivot table from the raw set of data, the pivot table formatted in accordance with the aggregate and merged information of the data structure.

16. The computer-readable medium of claim 15, further comprising a data diagram information component, wherein the data diagram information component includes an indication of breakdown shape information for the data diagram and shape information for the data diagram.

17. The computer-readable medium of claim 15 wherein the one or more instances of the breakdown shape information each include query and mapping information to any associated children shapes.

* * * * *